Feb. 21, 1933.                J. E. BOCKMANN                1,898,757
                              VACUUM CORN PICKER
                              Filed May 7, 1929           2 Sheets-Sheet 1
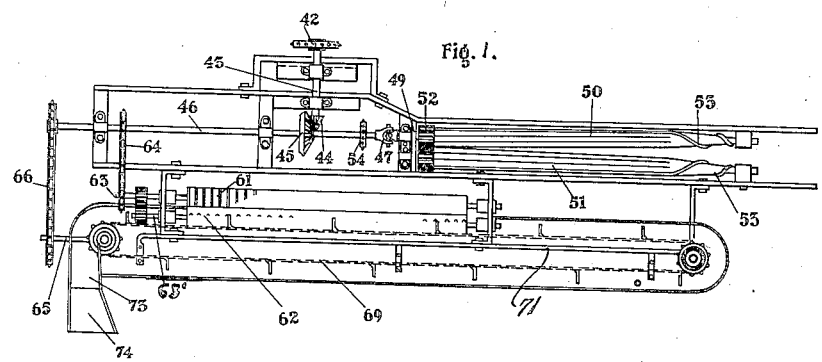
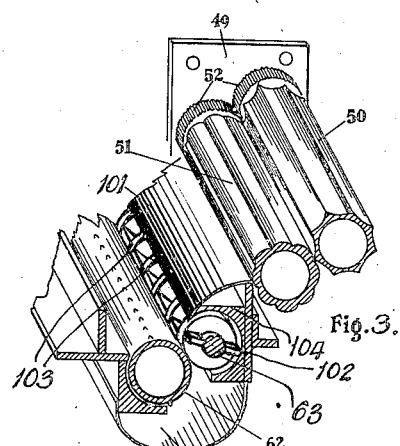
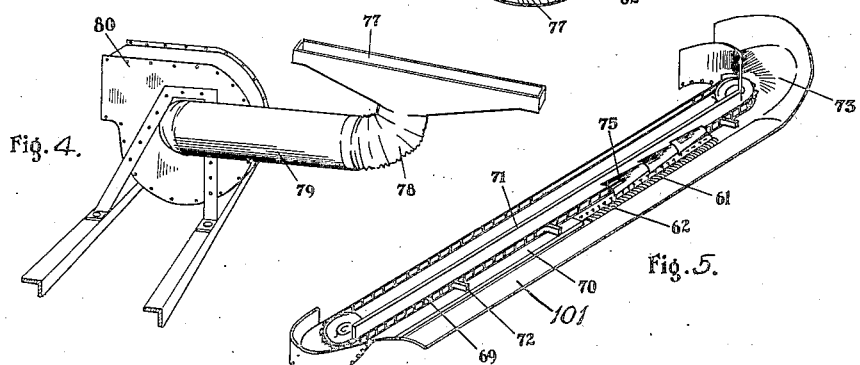
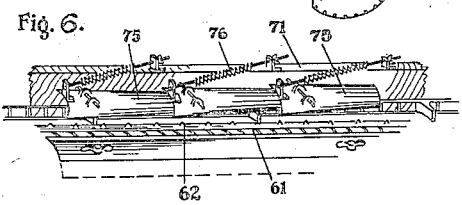
Inventor
J. E. Bockmann
By Emil F. Lange
Attorney Feb. 21, 1933.   J. E. BOCKMANN   1,898,757
VACUUM CORN PICKER
Filed May 7, 1929   2 Sheets-Sheet 2

J. E. Bockmann   Inventor

Patented Feb. 21, 1933

1,898,757

UNITED STATES PATENT OFFICE

JOHN E. BOCKMANN, OF ST. EDWARD, NEBRASKA, ASSIGNOR OF FIFTY-TWO PER CENT TO W. C. FOSTER, OF YORK, NEBRASKA

VACUUM CORN PICKER

Application filed May 7, 1929. Serial No. 361,071.

My invention relates to corn pickers, one of its objects being the provision of a pneumatic device whereby the husks are torn from the ears of corn largely by the action of a current of air.

Another of my objects is the provision of a husking mechanism which will loosen the husks from the ear of corn with further provision of a pneumatic device for separating the husks from the ears and for discharging the husks.

Another of my objects is the provision of a novel drag mechanism for maintaining the ears in close contact with the husking mechanism until the husks have been stripped from the ears.

Having in view these objects and others which will be pointed out in the following description, I will now refer to the drawings, in which Figure 1 is a plan view of the picking and husking mechanism, the conveyors above the picking mechanism being removed to more clearly disclose the picking mechanism.

Figure 3 is a view in isometric projection showing particularly the snapping rollers, the husking rollers and the apron conveyor between them.

Figure 4 is a view in perspective of the blower for removing the husks.

Figure 5 is a view in perspective showing the mechanism for dragging the snapped ears through the husking mechanism.

Figure 6 is a perspective view of a portion of the mechanism shown in Figure 7.

Figure 2:
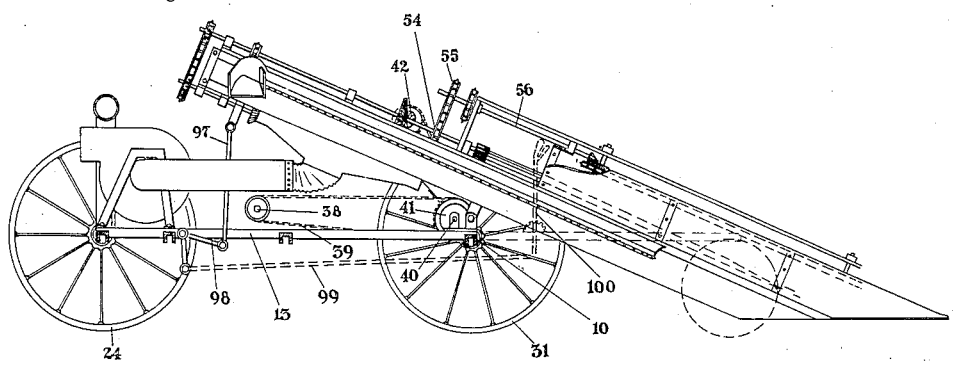
Figure 2 is a view in side elevation of that portion of my corn picker which contains the picking and husking mechanism.

The sprocket wheel 42, as best shown in Figure 1, is secured to a shaft 43 which carries a bevel pinion 44 at its inner extremity. The bevel pinion 44 meshes with the bevel gear 45 to drive the shaft 46. At its forward end the shaft 46 is provided with a universal joint 47 and it then passes through a wall 49 to the snapping roller 50. The snapping rollers 50 and 51 are provided with intermeshing gears 52 so that they are driven in opposite directions but it should be noted that the snapping rollers 50 and 51 are complementary and that they tend to carry the snapped ears of corn over the roller 51. The snapping rollers 50 and 51 have bearings at their forward extremities and they are provided with feed screws 53 immediately in the rear of the bearings. It will be evident that during the forward progress of the machine as a whole the cornstalks will be engaged by the feed screws 53 and that the ears will be snapped from the stalks.

The husking mechanism includes two husking rolls 61 and 62 for loosening the husks from the ears of corn. The roll 62 is provided with two longitudinal rows of teeth which engage the husks while the roll 61 has a rotating toothed beater which permits the free circulation of air through the roll.

The roll 61 comprises the spaced apart discs 103 which are rigidly mounted upon the shaft 63 or may be made integral therewith so as to rotate with the shaft 63. Between these discs 103 are wedged the plates 102 on diametrically opposite sides of the shaft 63. There is a form or hood 104 partly covering the roll 61 so that air may only pass through the roll between the discs 103 at the exposed portion of the roll 61.

Referring again to Figure 1, it will be seen that the shaft 46 drives the shaft 63 through the sprocket chain 64, the shaft 63 having the husking roll 61 secured thereto. The shaft 63 is connected with the shaft 63' through intermeshing gearing, the shaft 63' having the roll 62 secured thereto. It is necessary, however, that a conveyor be employed in dragging the ears over the husking rolls. For this purpose I provide an endless conveyor which is driven from a shaft 65 which receives power through the sprocket chain 66 from the shaft 46. The ears falling from the snapping rolls over the apron 101 will fall on to the husking rolls at or near their forward extremity and it is desirable therefore that the conveyor 69 drag these ears over the husking rolls in a rearward direction.

Figure 7:
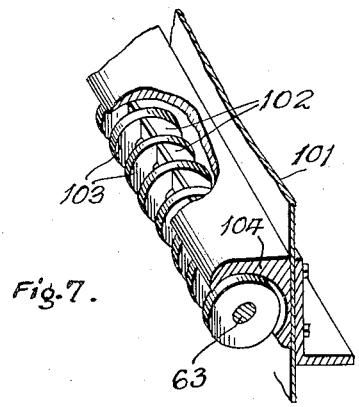
Figure 7 is an enlarged fragmentary perspective view of the suction controlling husking roll.

The relation of the chain 69 to the husking rolls 61 and 62 is best shown in Figure 7. Underneath the chain and above a portion of the husking rolls is a platform 70, the platform being cut away to expose the operative portions of the husking rolls. A wall 71 secured to the platform 70 separates the inner and outer runs of the conveyor 69. The conveyor is provided with outwardly projecting lugs 72 for positively engaging the ears of corn, the lugs 72 being spaced sufficiently to receive the longest ears of corn between two consecutive projections. The platform 70 terminates in a curved chute 73 which delivers the ears of corn at the side and at the rear of the husking mechanism into another chute 74 shown in Figure 2. The ear of corn will be rolled by the husking rolls 61 and 62 and it will be dragged over these rolls by the projections 72 on the conveyor 69. It is desirable, however, that an even more intimate contact be made between the ear of corn and the husking rolls and for this purpose I provide yielding pressure members 75. As shown in Figure 8, these pressure members taper toward their forward extremities and their rear extremities are supported by means of coil springs 76 attached to upstanding lugs at the rear extremities of the pressure members and to upstanding lugs on the upper edge of the wall 71. The ears will be dragged through these pressure members which tend to force them down against the husking rolls. By this means the husks are torn off from the ears of corn and are carried by the husking roll 62 and by a current of air into the chute 77 immediately beneath the husking rolls, the current of air coming through the roll 61.

The chute 77 delivers the corn husks through a canvas elbow 78 into the pipe 79 and through a blower 80 where they are discharged in the rear of the implement as shown in Figure 1.

As the rolls 61 and 62 rotate the plates 102 on the roll 61 will come in contact with the roll 62 and at this time air is prevented from passing downwardly through the roll 61 and the blower 80 will exhaust the air from the chute 77 and the space beneath the rolls 61 and 62. Upon further rotation of the rolls 61 and 62, the plates 102 of the roll 61 will move out of contact with the roll 62 and there will be a sudden, strong suction of air passing downwardly between the discs 103 of the roll 61 whereby the husks are torn off from the ears of corn and discharged from the machine.

Having thus described my invention in such full, clear, and exact terms that its construction and operation will be readily understood by others skilled in the art to which it pertains, what I claim as new and desire to secure by Letters Patent of the United States is:

1. A husking mechanism comprising a roller having a row of teeth thereon, a second roll associated with said first mentioned roll, said second roll consisting of a plurality of spaced apart discs, plates wedged between said discs, said plates adapted to contact with the first mentioned roll in one position of the second roll to prevent air from passing downwardly between said discs, and suction means for creating a vacuum beneath said rolls, said plates adapted to be moved out of contact with said first roll whereby a sudden suction is induced downwardly between the discs of the second roll.

2. A husking mechanism including a pair of husking rolls, suction means underneath said rolls for inducing a suction therebetween to remove the husks from ears of corn, and means on said husking rolls for intermittently shutting off the suction between said rolls.

In testimony whereof I affix my signature.

JOHN E. BOCKMANN.